United States Patent [19]

Taylor

[11] 4,025,580

[45] May 24, 1977

[54] MODIFIED STYRENEPOLYMERS

[75] Inventor: Lynn J. Taylor, Haslett, Mich.

[73] Assignee: Owens-Illinois, Inc., Toledo, Ohio

[22] Filed: Dec. 18, 1972

[21] Appl. No.: 315,798

[52] U.S. Cl. .............................. 260/874; 260/892; 260/898; 260/901; 260/DIG. 43; 260/897 B; 260/899

[51] Int. Cl.$^2$ ......................................... C08L 25/18

[58] Field of Search .......... 260/66 R, 886, DIG. 43, 260/94.9 GC, 892, 874, 901, 898

[56] References Cited

UNITED STATES PATENTS

| 2,374,589 | 4/1945 | Dreisbach | 260/63 |
| 2,500,082 | 3/1950 | Lieber et al. | 260/63 |
| 2,713,570 | 7/1955 | Kenyon et al. | 260/63 |
| 3,219,644 | 11/1965 | Leavitt | 526/21 |
| 3,304,294 | 2/1967 | Leavitt et al. | 526/46 |
| 3,434,979 | 3/1969 | Gregor et al. | 260/2.1 E |
| 3,753,952 | 8/1973 | Guillet | 260/63 |

Primary Examiner—V.P. Hoke
Attorney, Agent, or Firm—Donald Keith Wedding

[57] ABSTRACT

There is disclosed a process for preparing chemically modified styrene polymers and copolymers which comprises treating a polystyrene or a styrene copolymer with an acyl halide in the presence of a Lewis acid so as to introduce ketone groups into the treated polymer or copolymer in an amount sufficient to promote environmental photodegradation of the treated polymer or copolymer. The resulting modified polymers may be used as degradable packaging materials, or as additives to promote the environmental degradation of polystyrene and related materials.

10 Claims, No Drawings

MODIFIED STYRENEPOLYMERS

BACKGROUND OF THE INVENTION

This invention relates to novel plastic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by microorganisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One approach to the alleviation of the problem of plastics waste and litter would involve the development of novel polymeric compositions which undergo accelerated degradation under environmental conditions. This general approach has been described in the prior art. For example, reference is made to British Patent Specification No. 1,128,793, which describes ethylene-carbon monoxide copolymers which undergo rapid deterioration when subjected to sunlight. Presumably, such materials undergo photolytic chain scission as a result of the absorption of ultraviolet light by the ketone group derived from carbon monoxide.

Photosensitizing ketone groups have also been introduced into the structure of polymer molecules by the copolymerization of ethylenically unsaturated monomers with vinyl ketones. For example, reference is made to German Offen. Patent No. 2,119,855, which describes the preparation of photo-degradable polymeric materials, e.g., by the copolymerization of methyl methacrylate and methyl vinyl ketone.

Polymers having ketone groups within the polymer chain, or at positions adjacent to the chain, such as those derived from carbon monoxide or vinyl ketone co-monomers, are believed to undergo photochemical degradation by direct photolytic chain scission, without the formation of reactive intermediates such as free radicals. This mechanism does lead to a rapid decrease in molecular weight upon exposure to ultraviolet radiation. However, if we consider such materials as polymeric additives to be blended with unmodified organic polymers, the "direct photolysis" mechanism causes the modified polymer to be an inefficient sensitizer. In other words, when a blend of modified and unmodified molecules is exposed to ultraviolet radiation, the modified molecules undergo degradation but the unmodified molecules remain unaffected.

This invention is intended to provide photo-degradable polymeric materials which are also effective photosensitizing additives when combined with unmodified polymers. This is accomplished by the introduction of photosensitizing ketone groups into positions which are not adjacent to the atoms of the molecular chain, in such a manner that the ketone groups, upon photoexcitation, tend to form free radical intermediates, and thus promote photo-oxidative degradation rather than photolytic chain scission.

The processes of this invention also differ from those of the prior art in another respect, namely that the photosensitive polymer is prepared by chemical modification of a previously synthesized polymer, rather than by copolymerization of a ketone-containing monomer with another vinyl monomer.

DESCRIPTION OF THE INVENTION

In accordance with this invention, a novel polymeric composition, degradable under environmental conditions, is prepared by the Friedel-Crafts acylation of alkylation of polystyrene or a styrene copolymer.

More particularly, there is prepared a degradable polymeric material by the reaction of a styrene polymer with an acylating agent in the presence of a Lewis acid catalyst.

The term "styrene polymer", as used herein, should be understood to include polystyrene, copolymers of styrene with other ethylenically unsaturated monomers such as acrylonitrile, butadiene, and methyl methacrylate, and polymers and copolymers derived from substituted styrenes, such as alpha-methylstyrene, vinyl toluene, and various chlorostyrenes. The styrene polymer may be of any desired molecular weight and tacticity.

The term acylating agent, as used herein, may be defined as an organic reagent which is capable of introducing an acyl group

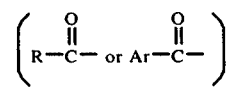

upon reaction with an aromatic hydrocarbon in the presence of a suitable catalyst. Preferred acylating agents include organic acyl halides and organic acid anhydrides. Under appropriate circumstances, carboxylic acids, esters, mixed carboxylic-sulfonic acid anhydrides, etc. may also be used as acylating agents.

Specific examples of suitable acylating agents include monofunctional acyl halides such as acetyl chloride, acetyl bromide, propionyl chloride, butyryl chloride, isobutyryl chloride, hexanoyl chloride, decanoyl chloride, 2-ethylhexanoyl chloride, lauroyl chloride, 10-undecenoyl chloride, oleoyl chloride, palmitoyl chloride, phenylacetyl chloride, phenoxyacetyl chloride, benzoyl chloride, benzoyl bromide, p-anisoyl chloride, p-tert-butylbenzoyl chloride, methoxyacetyl chloride, chloroacetyl chloride, p-toluoyl chloride, acryloyl chloride, methacryloyl chloride, crotonyl chloride, cinnamoyl chloride, and phenothiazine-10-carbonyl chloride; difunctional acyl halides such as phthaloyl chloride, isophthaloyl chloride, terephtahaloyl chloride, oxalyl chloride, malonyl dichloride, and sebacoyl chloride; and anhydrides of organic acids, including phthalic anhydride, succinic anhydride, maleic anhydride, acetic anhydride, propionic anhydride, and benzoic anhydride.

Appropriately substituted alkyl halides, such as those containing ketone groups, may also be considered as acylating agents within the scope of the present invention. Specific examples include phenacyl chloride, phenacyl bromide, beta-chloropropiophenone, gamma-chlorobutyrophenone, and 2-chloro-2-phenylacetophenone.

The phrase "Lewis acid catalyst", as used herein, may be defined as an electron-pair acceptor, i.e., a reagent which tends to accept an electron pair provided by a second reagent ("Lewis base") having available at least one unshared pair of electrons, said electron pair being shared by the two reagents, with the formation of a covalent chemical bond.

Specific examples of suitable Lewis acids include aluminum chloride, aluminum bromide, ferric chloride, stannic chloride, mercuric chloride, beryllium chloride, zinc chloride, titanium tetrachloride, borontrifluoride, boron trichloride, iodine, phosphorus pentoxide, and sulfur trioxide. Since the hydrogen ion (proton) is also a Lewis acid, the term "Lewis acid catalyst" should be understood to include also such proton-donating acids as hydrogen fluoride, hydrogen chloride, sulfuric acid, phosphoric acid, polyphosphoric acid, and trifluoromethanesulfonic acid.

The reaction of the styrene polymer, acylating agent, and Lewis acid catalyst may be conducted under a variety of conditions — at sub-ambient, ambient, or elevated temperatures, in the presence or absence of a solvent. The styrene polymer, acylating agent, and Lewis acid catalyst may be combined in various ratios, e.g., stoichiometric or non-stoichiometric. Preferably, the reaction is conducted in a non-reactive solvent such as methylene chloride, ethylene dichloride, chlorobenzene, nitrobenzene, nitromethane, or carbon disulfide. The modified polymer may be isolated and purified by methods known in the prior art, such as solvent evaporation, precipitation, filtration, etc.

Modified polymers prepared in accordance with this invention may be melted and shaped by methods known in the prior art, such as molding, extrusion, calendering, thermoforming, etc. With the aid of such processing methods, degradable packaging products such as films, cups, bottles, may be prepared.

It is also contemplated that the modified polymers of this invention may be used as additives to control the environmental degradability of unmodified polymers such as polystyrene. For example, the modified polymer, in solid form, may be blended with pellets or granules of an unmodified organic polymer, and the resulting mixture melted and subsequently molded or extruded to produce a shaped article. Alternatively, the modified and unmodified polymers may be blended when one (or both) is in the molten state, or when one (or both) is dissolved in a suitable solvent. While it is expected that the unmodified polymer will ordinarily be polystyrene or a styrene copolymer, the use of unmodified polymers of other chemical types, such as polyethylene and poly(vinyl chloride), is also contemplated.

Degradable compositions and shaped articles prepared from the modified polymers of this invention may also contain non-reactive additives. By the term "non-reactive additive" is means a chemical additive, filler, or reinforcement which does not react with the modified polymer or materially interfere with its environmental degradation. Examples of such non-reactive additives include plasticizers, lubricants, anti-oxidants, antistatic agents, colorants, flame retardants, fillers and fibrous reinforcements.

The following EXAMPLE illustrates one of the best embodiments contemplated by the inventor.

EXAMPLE

A resin flask fitted with heating mantle, mechanical stirrer, and reflux condenser was flushed with dry nitrogen and charged with a solution of 52.0 grams (g.) polystyrene (Lustrex HF-55; quantity corresponds to 0.50 mole of monomer units) and 15.46 g. (0.10 mole) phenylacetyl chloride in 300 ml. dry methylene chloride. A nitrogen atmosphere was maintained and the reaction mixture was stirred while 14.67 g. (0.11 mole) anhydrous aluminum chloride was added, in small portions, during a period of 75 minutes. Methylene chloride (100 ml.) was used to wash into the reaction mixture portions of the aluminum chloride which adhered to the walls of the reaction vessel. The reaction mixture was stirred an additional 15 min., refluxed for 30 min., allowed to cool to room temperature, and poured into an ice-cold mixture of 100 milliliters (ml.) concentrated hydrochloric acid and 1000 ml. distilled water. Additional methylene chloride (250 ml.) was added and the mixture stirred and allowed to warm to room temperature.

The organic layer was separated, transferred to a separatory funnel, diluted with 1000 ml. additional methylene chloride, and washed with 10% aqueous sodium carbonate solution followed by saturated aqueous sodium chloride solution. The polymer was then precipitated by adding the methylene chloride solution to 2000 ml. methanol. The precipitated polymer was filtered, washed with methanol, and dried. This yielded 58.1 g. of product, a tough, white solid.

A thin film of the modified polymer, of thickness ca. 0.08 mm., was prepared by casting from benzene solution onto a glass plate. Similar films were prepared from unmodified polystyrene (Lustrex HF-55) and a 1:3 (wt./wt.) blend of the modified polymer and unmodified polystyrene.

The three films were irradiated in air for a period of 24 hrs., using radiation from four 1.4-watt circular ultraviolet lamps emitting principally at a wavelength of 305 millimicrons. The irradiated films were examined by infrared spectrophotometry; in each case, the irradiation had led to the appearance of a carbonyl band at 1725 cm.$^{-1}$ indicative of photooxidative degradation; in the case of the modified polymer, this band could be clearly resolved from the band due to carbonyl groups present prior to irradiation. The extent of photooxidative degradation under the test conditions was determined from the intensity of the 1725 cm$^{-1}$ band. The following results were obtained:

| Film | Extent of Degradation (Increase in Absorbance at 1725 cm.$^{-1}$) |
|---|---|
| Modified Polymer | 0.665 |
| 1:3 Blend | 0.365 |
| Unmodified Polystyrene | 0.080 |

I claim:

1. A process for preparing mixtures of chemically modified styrene polymers or copolymers and unmodified polystyrene which comprises preparing said chemically modified styrene polymers or copolymers by reacting a styrene polymer or copolymer with an acylating agent in the presence of a Lewis Acid catalyst so as to introduce ketone groups into positions in the polymer or copolymer which are not adjacent to the atoms of the molecular chain, the amount of said acylating agent being sufficient to cause said ketone groups to form free radical intermediates upon photo-excitation and promote environmental photo-oxidative degradation of the polymer or copolymer; and subsequently incorporating said chemically modified polymers or copolymers into unmodified polystyrene in an amount sufficient to promote environmental photodegradation of the unmodified polymer.

2. The invention of claim 1 wherein the acylating agent is selected from the group consisting of organic monofunctional acyl halides, organic difunctional acyl halides, organic acid anhydrides and alkyl halides containing ketone groups.

3. As a composition of matter, a mixture of a chemically modified styrene polymer or copolymer and unmodified polystyrene, prepared by the process of claim 1.

4. The invention of claim 2 wherein said organic monofunctional acyl halides are selected from the group consisting of acetyl chloride, acetyl bromide, propionyl chloride, butyryl chloride, isobutyryl chloride, hexanoyl chloride, decanoyl chloride, 2-ethylhexanoyl chloride, lauroyl chloride, 10-undecenoyl chloride, oleoyl chloride, palmitoyl chloride, phenylacetyl chloride, phenoxyacetyl chloride, benzoyl chloride, benzoyl bromide, p-anisoyl chloride, p-tert-butylbenzoyl chloride, methoxyacetyl chloride, chloroacetyl chloride, p-toluoyl chloride, acryloyl chloride, methacryloyl chloride, crotonyl chloride, cinnamoyl chloride, and phenothiazine-10-carbonyl chloride.

5. The invention of claim 2 wherein said organic difunctional acyl halides are selected from the group consisting of phthaloyl chloride, isophthaloyl chloride, terephthaloyl chloride, oxalyl chloride, malonyl dichloride, and sebacoyl chloride.

6. The invention of claim 2 wherein said organic acid anhydrides are selected from the group consisting of phthalic anhydride, succinic anhydride, maleic anhydride, acetic anhydride, propionic anhydride, and benzoic anhydride.

7. The invention of claim 2 wherein said alkyl halides containing ketone groups are selected from the group consisting of phenacyl chloride, phenacyl bromide, beta-chloropropiophenone, gamma-chlorobutyrophenone, and 2-chloro-2-phenylacetophenone.

8. The invention of claim 4 wherein said styrene polymers are selected from the group consisting of polystyrene, alphamethylstyrene, and vinyl toluene.

9. The invention of claim 4 wherein said styrene copolymers are copolymers of styrene and other ethylenically unsaturated monomers selected from the group consisting of acrylonitrile, butadiene and methyl methacrylate.

10. The invention of claim 4 wherein said Lewis Acid catalyst is selected from the group consisting of aluminum chloride, aluminum bromide, ferric chloride, stannic chloride, mercuric chloride, beryllium chloride, zinc chloride, titanium tetrachloride, borontrifluoride, boron trichloride, iodine, phosphorus pentoxide sulfur trioxide, hydrogen fluoride, hydrogen chloride, sulfuric acid, phosphoric acid, polyphosphoric acid, and trifluoromethanesulfonic acid.

* * * * *